US011784939B2

(12) United States Patent
Nakfour

(10) Patent No.: US 11,784,939 B2
(45) Date of Patent: *Oct. 10, 2023

(54) CLOUD RESOURCE MANAGEMENT USING EXTERNALLY-SOURCED DATA

(71) Applicant: RED HAT, INC., Raleigh, NC (US)

(72) Inventor: Juana Nakfour, Hawthorn Woods, IL (US)

(73) Assignee: Red Hat, Inc., Raleigh, NC (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/468,855

(22) Filed: Sep. 8, 2021

(65) Prior Publication Data

US 2021/0409341 A1 Dec. 30, 2021

Related U.S. Application Data

(63) Continuation of application No. 16/174,332, filed on Oct. 30, 2018, now Pat. No. 11,159,446.

(51) Int. Cl.
*G06N 20/00* (2019.01)
*H04L 41/16* (2022.01)
*H04L 47/70* (2022.01)
*H04L 67/1097* (2022.01)
*H04L 47/83* (2022.01)

(52) U.S. Cl.
CPC ............ *H04L 47/70* (2013.01); *G06N 20/00* (2019.01); *H04L 41/16* (2013.01); *H04L 47/83* (2022.05); *H04L 67/1097* (2013.01)

(58) Field of Classification Search
CPC . H04L 47/70; H04L 67/1097; H04L 41/5054; H04L 41/5096; H04L 41/0896; H04L 41/16; H04L 67/10; G06N 20/00
See application file for complete search history.

(56) References Cited

U.S. PATENT DOCUMENTS

| 8,578,028 | B2 | 11/2013 | Grigsby et al. |
| 9,289,394 | B2 | 3/2016 | Abueisaad et al. |
| 9,762,466 | B2* | 9/2017 | Cama .................... H04L 67/567 |
| 9,805,345 | B1 | 10/2017 | Dailianas et al. |
| 9,928,082 | B1 | 3/2018 | Van et al. |
| 10,043,194 | B2* | 8/2018 | Baughman ............. G06Q 10/04 |

(Continued)

OTHER PUBLICATIONS

Biswas, A., et al., "Automatic Resource Provisioning: A Machine Learning Based Proactive Approach," Dec. 14, 2014, https://ieeexplore.ieee.org/document/7037663/.

(Continued)

*Primary Examiner* — Aftab N. Khan
(74) *Attorney, Agent, or Firm* — Kilpatrick Townsend & Stockton LLP

(57) ABSTRACT

A processing device can make use of an Artificial Intelligence (AI) model to make projections about resource usage based on data from external sources. The processing device can then adjust cloud-based resources accordingly. The cluster resource allocation can be adjusted as examples, by increasing, decreasing, or maintaining a number of nodes allocated to a cluster, by increasing, decreasing, or maintaining the number of pods assigned to an application or a container running in a cluster, or by increasing, decreasing, or maintaining central processing unit (CPU) resource, memory, disk storage, or a replication factor assigned to a pod.

17 Claims, 5 Drawing Sheets

(56) References Cited

U.S. PATENT DOCUMENTS

| | | | |
|---|---|---|---|
| 10,191,778 B1* | 1/2019 | Yang | G06F 11/301 |
| 2011/0145392 A1* | 6/2011 | Dawson | H04L 47/783 |
| | | | 709/224 |
| 2012/0233315 A1* | 9/2012 | Hoffman | G06F 9/5072 |
| | | | 709/224 |
| 2012/0271949 A1 | 10/2012 | Radhakrishnan et al. | |
| 2013/0254374 A1* | 9/2013 | Bogdany | G06Q 50/01 |
| | | | 709/224 |
| 2017/0262431 A1* | 9/2017 | Alam | G06F 40/30 |
| 2017/0351971 A1* | 12/2017 | Cai | G06F 40/30 |
| 2018/0121170 A1 | 5/2018 | Subramaniyan et al. | |
| 2019/0253490 A1* | 8/2019 | Du | H04L 67/1008 |
| 2022/0092071 A1* | 3/2022 | McIntosh | G06F 16/532 |

OTHER PUBLICATIONS

Polina, P.O., et al., "SOS: Social Network-Based Distributed Data Storage," Department of Computer Engineering and Computer Science, University of Louisville and InfoBeyond Technology LLC, Oct. 24, 2013, https://ieeexplore.ieee.org/document/6761311/.

"Everything You Need to Know About Social Media Monitoring," Salesforce, https://www.salesforce.com/products/marketing-cloud/best-practices/social-media-monitoring/.

\* cited by examiner

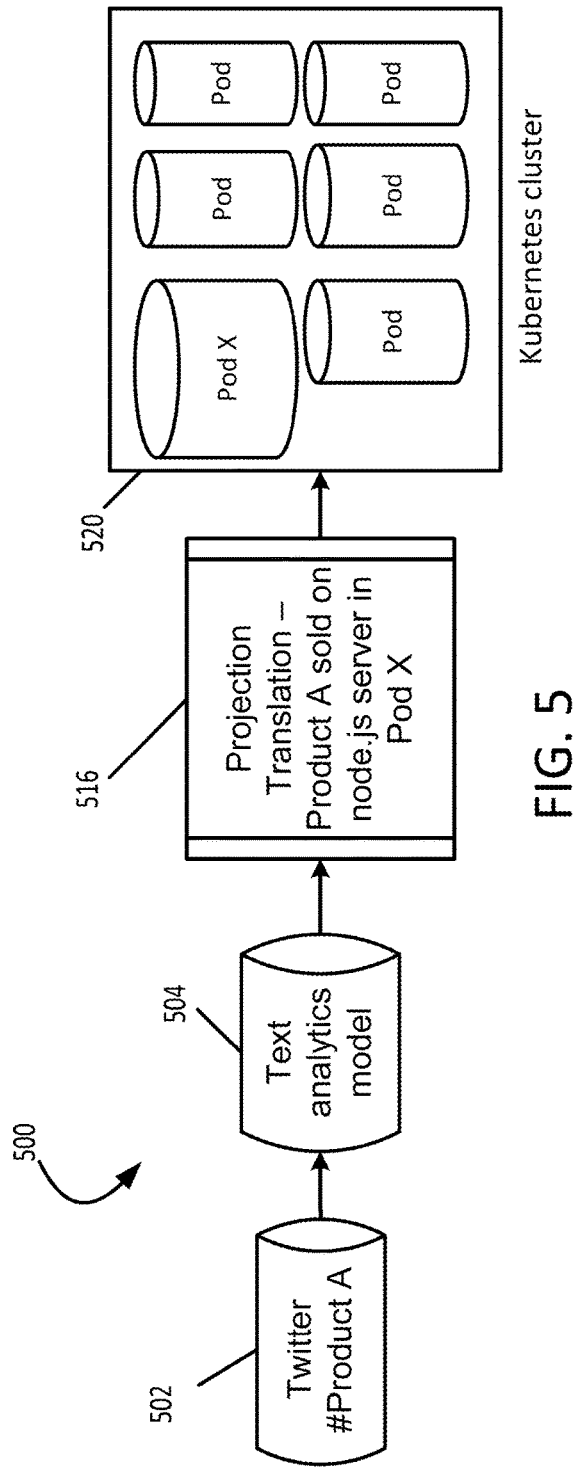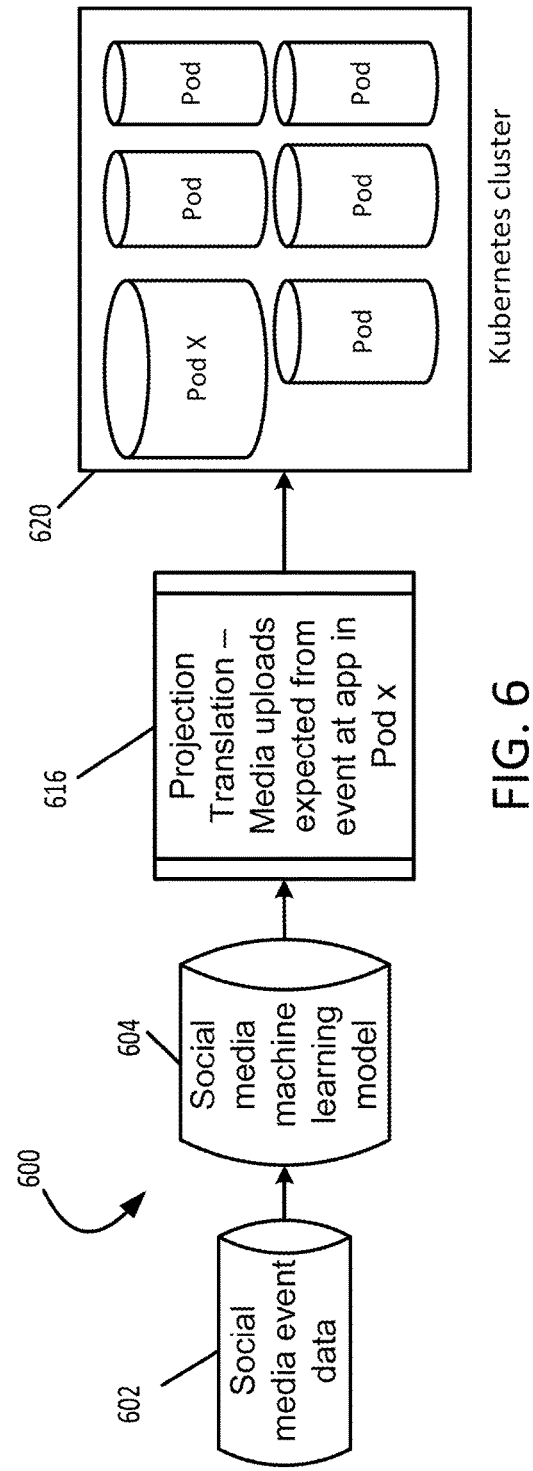

CLOUD RESOURCE MANAGEMENT USING EXTERNALLY-SOURCED DATA

CROSS-REFERENCE TO RELATED APPLICATION

This application is a continuation of and claims priority from U.S. patent application Ser. No. 16/174,332, filed Oct. 30, 2018, the entire disclosure of which is incorporated herein by reference.

TECHNICAL FIELD

The present disclosure relates generally to cloud computing systems. More specifically, but not by way of limitation, this disclosure relates to providing cloud resource management using Artificial Intelligence (AI) projections formulated based on data from sources external to the cloud network.

BACKGROUND

Network clusters used to implement a cloud computing system such as Kubernetes clusters or OpenShift clusters often have access to limited costly resources such as processing power, memory and storage space. The cost of maintaining such a network cluster can dramatically increase when demand requires increased resources. In order to handle workload efficiently and cost-effectively, the resources need to be provisioned optimally. Too many resources being allocated will incur unnecessary extra cost while too few resources being allocated can cause cluster and application performance issues. Since demand for cluster resources is dynamic and can vary dramatically over time, management of cluster-based cloud computing systems typically involves looking to past resource allocation patterns to make projections about future usage patterns and allocating resources accordingly.

BRIEF DESCRIPTION OF THE DRAWINGS

FIG. 5 is a data flow diagram showing an example of using an Artificial Intelligence (AI) model for software cloud resource management according to some aspects of the disclosure.

FIG. 6 is a data flow diagram showing another example of using an Artificial Intelligence (AI) model for software cloud resource management according to some aspects of the disclosure.

DETAILED DESCRIPTION

Figure 1:
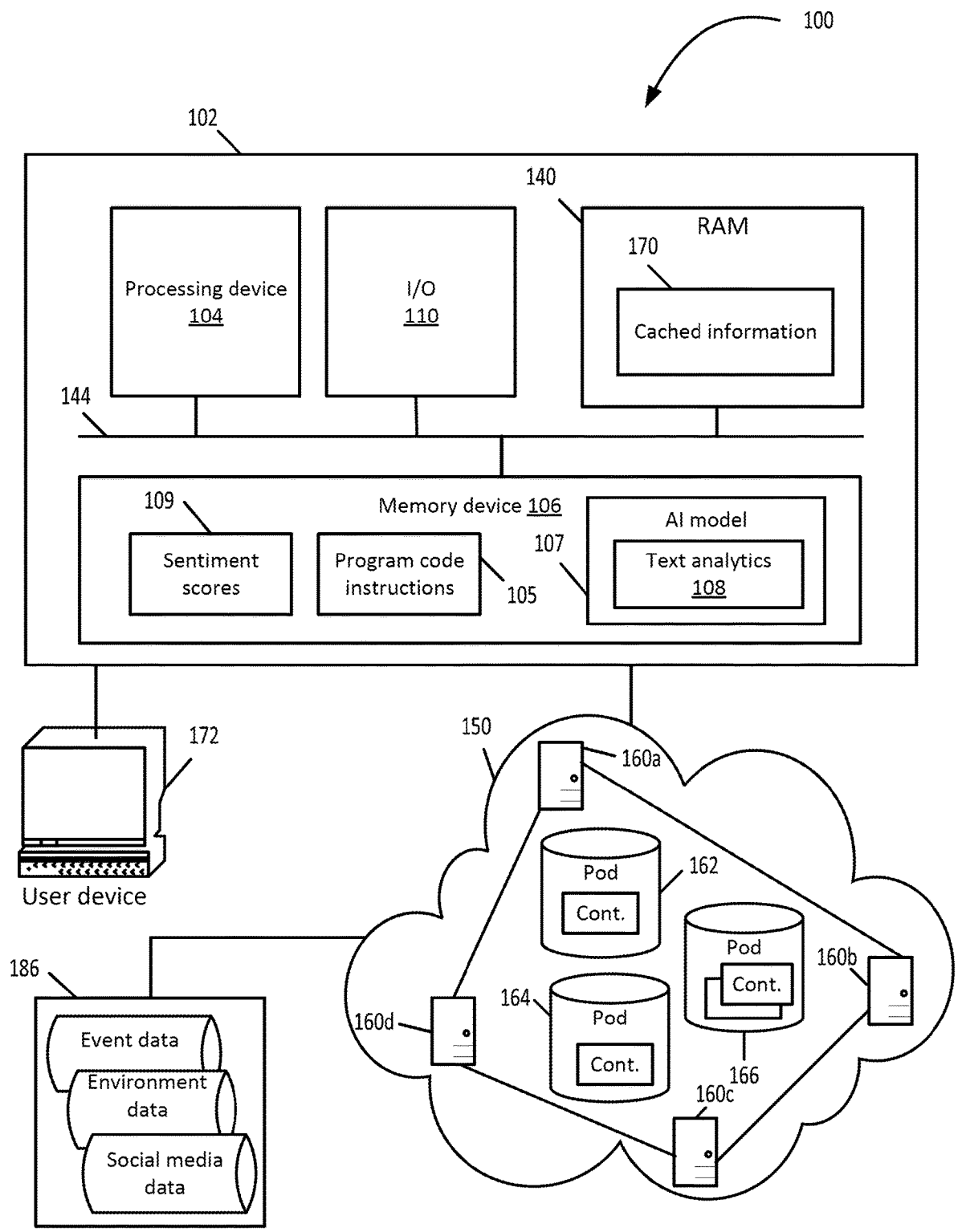
FIG. 1 is a block diagram of an example of a system that provides cloud resource management according to some aspects of the disclosure.

An orchestrator is a software platform used to deploy and manage application software in a cloud network ("cloud"). An orchestrator runs and manages resources associated with microservices and infrastructures within the cloud. Kubernetes and OpenShift are a well-known, popular orchestrators that use organized hardware and software clusters to deploy cloud-based applications in software containers, which can be further grouped into software pods. In order to handle workload efficiently and cost-effectively, resources need to be provisioned optimally. Since demand for cluster resources varies dramatically over time, resources are typically managed by examining internally documented, past resource allocation patterns to make projections about future usage patterns. Since usage of a cloud-based application can be impacted by external events, these projections are not always accurate. It is therefore common for resources to be improperly allocated to tasks that do not need them, while starving other tasks that may actually need them, resulting in errors, failures, and other problems.

Some examples of the present disclosure overcome one or more of the issues mentioned above by providing Artificial Intelligence (AI) predictions based on relevant data from sources external to the network clusters, such as social media, to dynamically adjust cluster resources. As examples, external sources can supply one or more of social media data, environment data, or event data. The predictions can be translated into action items to dynamically adjust appropriate cluster resources for cloud networks, such as those based on OpenShift or Kubernetes.

Some examples of the present disclosure make use of an Artificial Intelligence (AI) model to make projections about resource usage based on data from external sources and to adjust cloud-based resources accordingly. As an example, a processing device in a system can receive data samples from external sources, generate at least one projection based on the data samples and, use the Artificial Intelligence (AI) model to determine, based on the projection, prospective cluster resource usage for an application running on at least one cluster of the cloud resource network. The processing device can then adjust cluster resource allocation for the application in accordance with the prospective cluster resource usage determination.

In some examples, a processing device can receive training data from at least some external sources and train the Artificial Intelligence (AI) model as needed using the training data. In some examples, the cluster resource allocation is adjusted by increasing, decreasing, or maintaining a number of nodes allocated to the at least one cluster. Adjusting the number of nodes allocated to a cluster can be accomplished, as an example, by increasing, decreasing, or maintaining the number of pods assigned to the application, wherein each of the pods includes one or more containers. Adjusting the number of nodes allocated to a cluster can also be accomplished, as another example, by increasing, decreasing, or maintaining central processing unit (CPU) resource, memory, or a replication factor assigned to a pod.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 that provides cloud resource management according to some aspects of the disclosure. More specifically, the system 100 includes a computing device 102. Examples of the computing device 102 can include a server, laptop computer, desktop computer, or any combination of these. The computing device 102 can execute software as defined below, which causes computing device 102 to perform the tasks of making projections based on data from external sources and adjusting cluster resources according to some aspects of the disclosure. Software can include computer-readable instructions that are executable by a processing device 104, such as program code instructions 105. The system can be programmed in any suitable programming language, such as Java, C++, C, Python, or any combination of these. Note that the software that implements cloud resource management as described in an exemplary fashion herein is distinct from the software that makes up applications running in the cloud network. Program code instructions 105 implement cloud resource management as described herein.

In FIG. 1, computing device 102 includes the processing device 104, memory device 106, an input/output (I/O) module or modules 110, and a random-access memory (RAM) 140. A bus or interconnect 144 is also provided to allow for inter- and intra-device communications using, for example, I/O module 110. I/O module 110 can include a network interface (not shown), which in turn communicates with cloud network 150. Cloud network 150 connects computing device 102 to nodes 160a, 160b, 160c, and 160d, which in this example make up at least a portion of a hardware cluster. Each node can include a processing device, a memory device, I/O, and other components similar to computing device 102 and other typical computing devices. In the example of FIG. 1, nodes 160a-160d run pods 162, 164, and 166, each including one or more containers. A container operates is a substantially isolated virtual environment that can run an instance of the application for which resources are needed.

Still referring to FIG. 1, memory device 106 can further include a stored, Artificial Intelligence (AI) model 107. An Artificial Intelligence (AI) model can be or include, as examples, a deep-learning model or a machine-learning model. The Artificial Intelligence (AI) model 107 can receive data samples from external sources 186. The data samples may include, as examples, event data, environment data, or social media data. In some examples, Artificial Intelligence (AI) model 107 is or includes a text analytics model 108. The text analytics model 108 can be used to produce sentiment scores 109, which can be used to make projections regarding prospective cluster resource usage and which can also be stored in memory device 106 or as part of cached information 170. Textual data samples for this analysis can come, as an example, from social media data. Using Artificial Intelligence (AI) model 107, program code instructions 105 implement cloud resource management. Program code instructions 105 can include, as examples, a software component that translates projections into action items and a software component executes these action items on the clusters in the cloud network.

In the example of FIG. 1, cached information 170, such as external data samples, projections, prospective cluster usage information, and other information used by system 100 may be stored in RAM 140. In addition to connecting computing device 102 to nodes 160a-160d, I/O module 110 also connects computing device 102 to user device 172, which may be a personal computer, smartphone, tablet computer, or some other type of client device. User input can be received by computing device 102 through user device 172. User input and display functions can alternatively or additionally be provided through peripherals (not shown) locally attached to computing device 102. As one example, user input can be directed to causing the Artificial Intelligence (AI) model 107 to be retrained.

Figure 2:
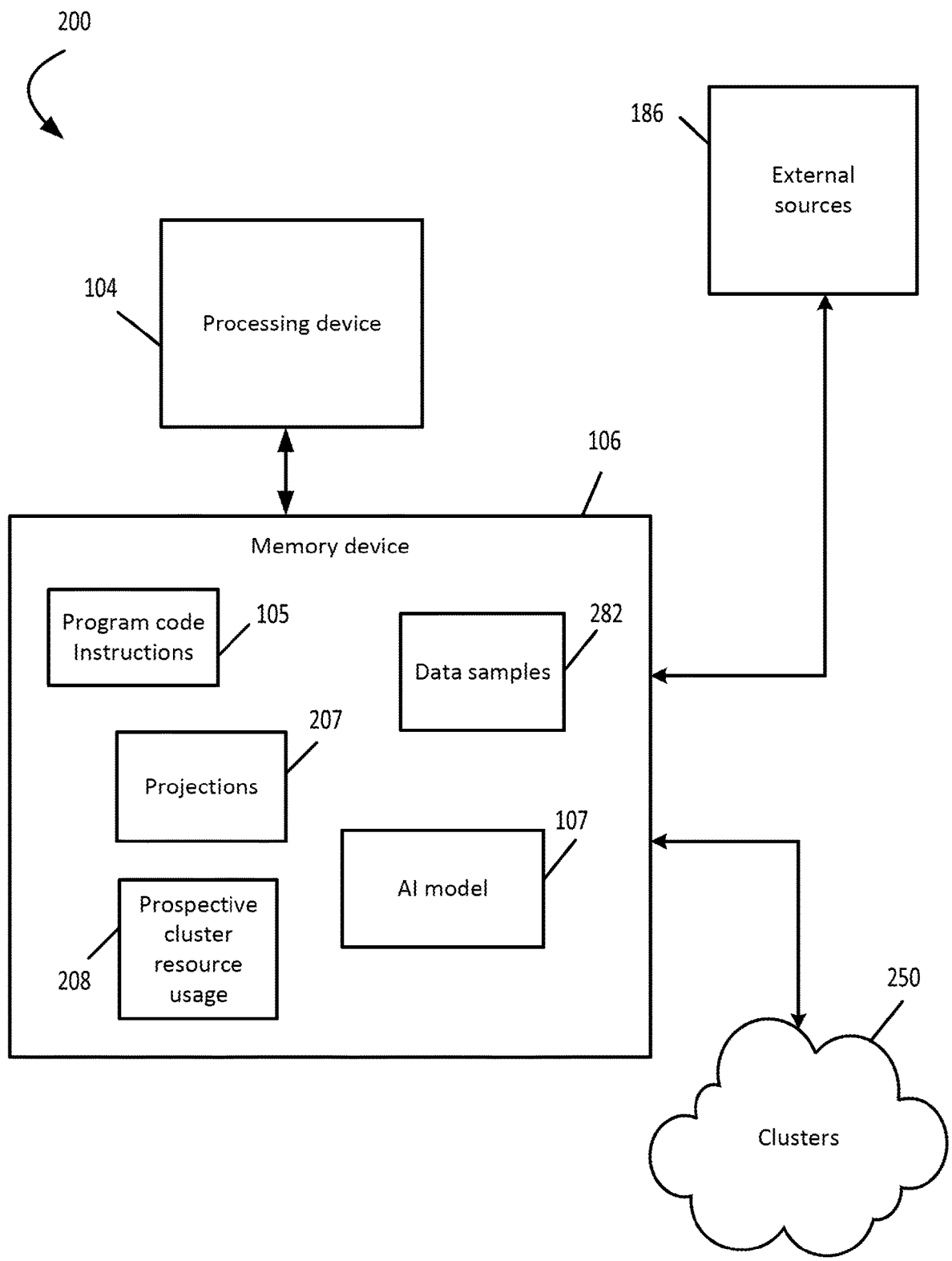
FIG. 2 is a block diagram of another example of a system that provides cloud resource management according to some aspects of the disclosure.

FIG. 2 is a block diagram of another example of a system that provides cloud resource management according to some aspects of the disclosure. The system 200 includes the processing device 104 that can execute computer program code, also referred to as instructions or program code instructions, for performing operations related to providing machine-learning or Artificial Intelligence (AI) projections based on relevant data from sources external to the network clusters, such as social media, to dynamically adjust cluster resources. Processing device 104 is communicatively coupled to the memory device 106. The processing device 104 can include one processing device or multiple processing devices. Non-limiting examples of the processing device 104 include a field-programmable gate array (FPGA), an application-specific integrated circuit (ASIC), a microprocessor, etc. The processing device 104 can execute one or more operations for generating at least one projection using the Artificial Intelligence (AI) model 107, and determine, based on the projection, prospective cluster resource usage for an application running on at least one cluster of the cloud resource network 250. The processing device can then adjust cluster resource allocation for the application in accordance with the prospective cluster resource usage. The processing device 104 can execute program code instructions 105 stored in the memory device 106. Computer program code instructions 105 can include instructions to train the Artificial Intelligence (AI) model 107 as needed. Computer program code instruction can also include a translate-to-action module that can, based on data samples from external sources, interpret projections and point to specific resources and components that need to be dynamically changed.

Memory device 106 can include one memory device or multiple memory devices. The memory device 106 can be non-volatile and may include any type of memory device that retains stored information when powered off. In some examples, at least some of the memory device can include a non-transitory computer-readable medium from which the processing device 104 can read instructions 105. A computer-readable medium can include electronic, optical, magnetic, or other storage devices capable of providing the processing device with computer-readable instructions 105 or other program code. Non-limiting examples of the memory device 106 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 106 can include the Artificial Intelligence (AI) model 107 and information needed to train and retrain Artificial Intelligence (AI) model 107. The system of the example of FIG. 2 includes the same external sources 186 as shown in FIG. 1. The memory device 106 can also include projections 207 and prospective cluster resource usage information 208 determined from the projections, as well as data samples 282 from external sources 186. Although FIGS. 1 and 2 depict a certain arrangement of components for illustrative purposes, other examples can include any number and combination of these components arranged in any suitable configuration.

Figure 3:
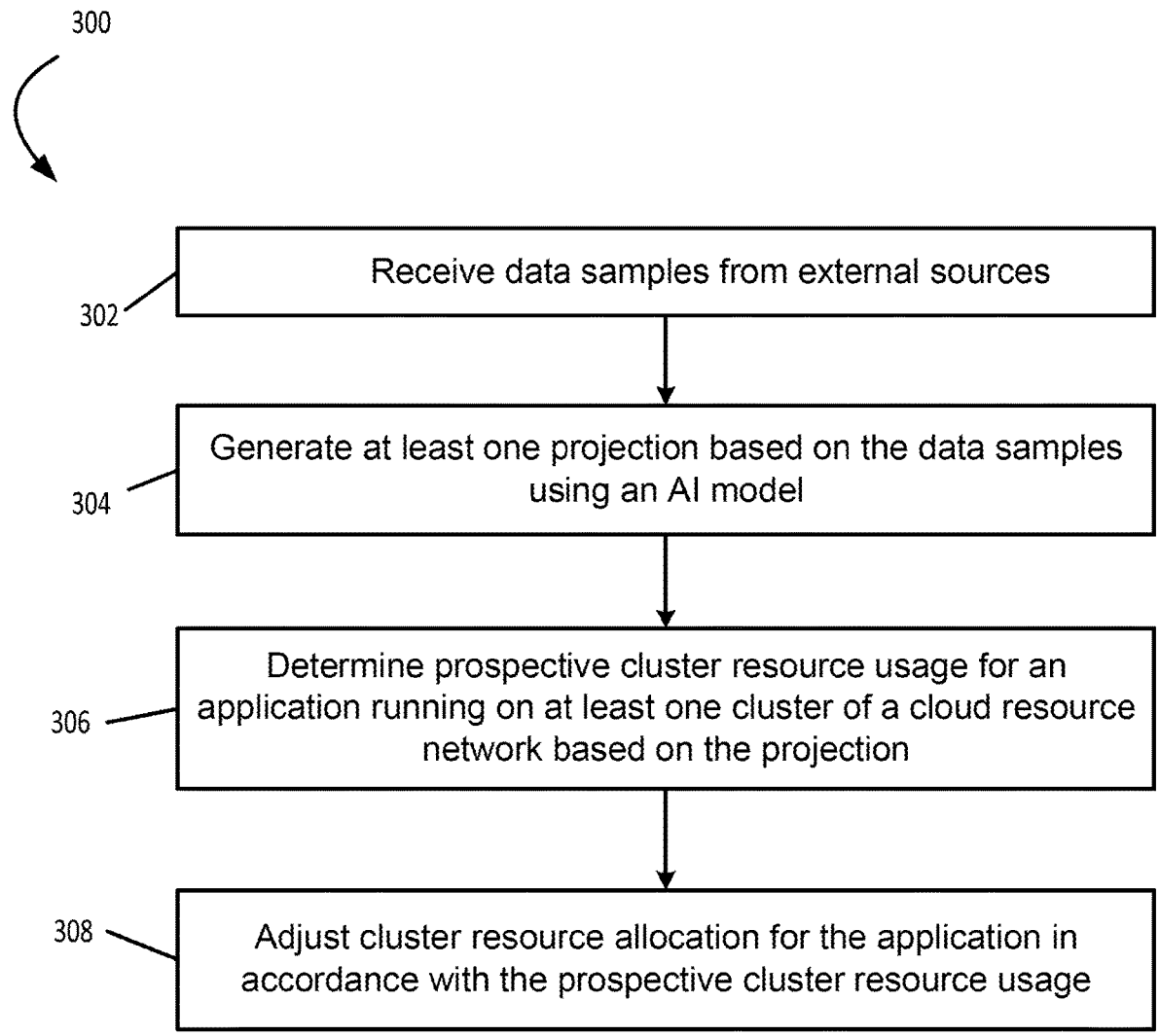
FIG. 3 is a flowchart of an example of a process for providing cloud resource management according to some aspects of the disclosure.

In some examples, a processing device (e.g., processing device 104) can perform one or more of the operations shown in FIG. 3 to provide provides cloud resource management according to some aspects of the disclosure. In other examples, the computing device can implement more operations, fewer operations, different operations, or a different order of the operations depicted in FIG. 3. Process 300 of FIG. 3 is described below with reference to components discussed above. At block 302, processing device 104 receives data samples from external sources 186. At block 304 of FIG. 3, processing device 104 uses Artificial Intelligence (AI) model 107 to generate at least one projection based on the data samples. At block 306, processing device 104 determines prospective cluster resource usage for an application running on at least one cluster of a cloud resource network based on the projections. At block 308 cloud resource allocation is adjusted for the application in accordance with the predicted cluster resource usage.

Figure 4:
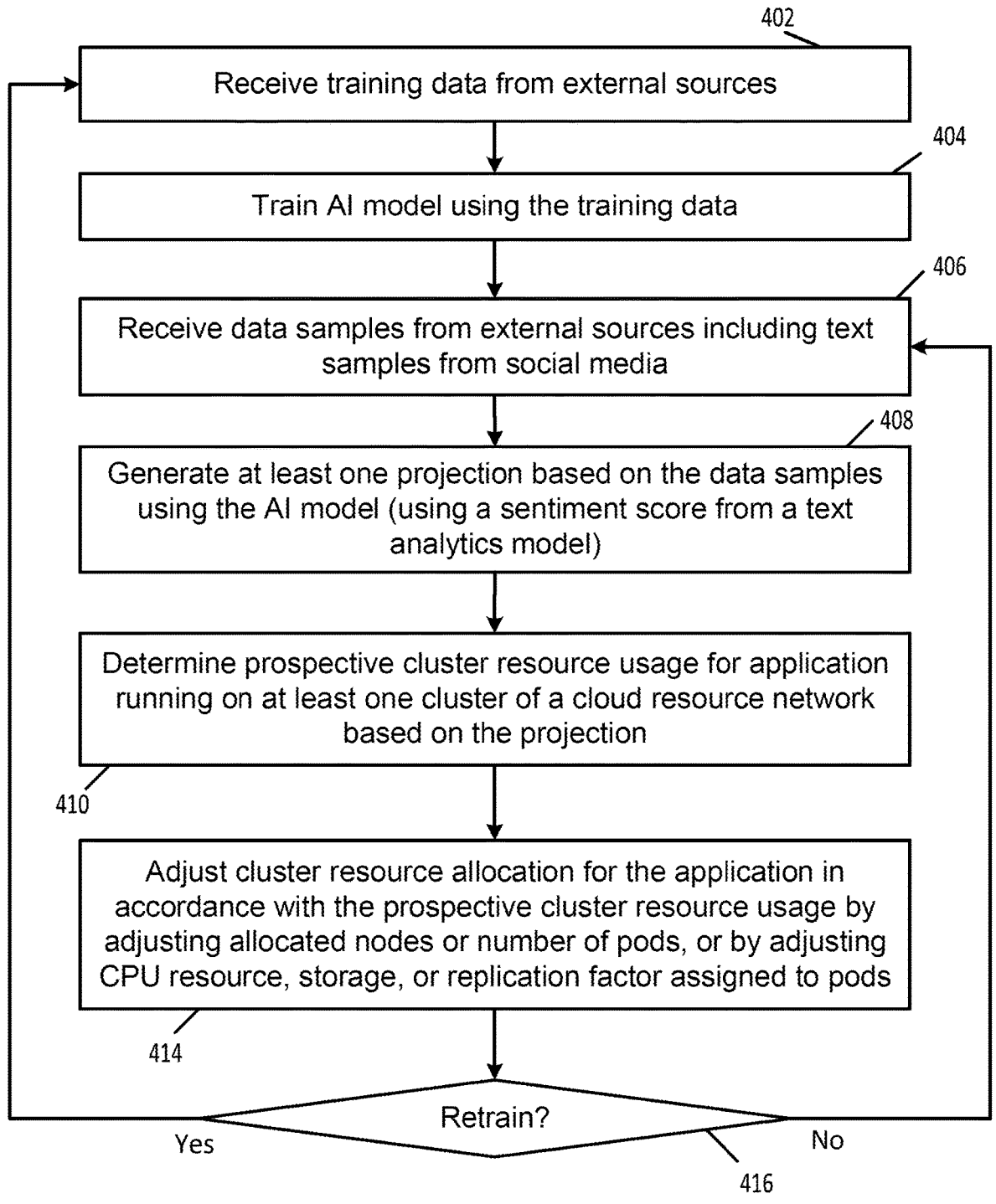
FIG. 4 is a flowchart of another example of a process for providing cloud resource management according to some aspects of the disclosure.

As another example, a computing device such as processing device 104 can perform the operations of process 400 shown in FIG. 4 to provide cloud resource management according to some aspects of the disclosure. At block 402, processing device 104 receives information from sources outside the cloud network resources being managed. This information is used by processing device 104 to produce training data to train Artificial Intelligence (AI) model 107 at block 404 of FIG. 4 for producing projections when data is available and relevant in the future. Training data can be obtained, as an example, by scraping text samples from various Internet services based on search criteria. At block 406, data samples are received by the processing device 104. At block 408, the data samples can be provided as input to the trained model 107 in order to obtain an output indicating a projection. If the data samples are text samples, the model can optionally include a text analytics model that carries out sentiment analysis in order to make the projection or projections. For example, the model text analytics model can analyze the text sample to determine whether the text sample has a positive or negative sentiment related to a particular event, and then generate the projection based on which type of sentiment is associated with the particular event.

In some examples, the data can include environment data. For example, an expected bout of bad weather or storms may suggest an increase in resource usage for weather related applications or emergency services applications. As another example, external data can include event data, which indicates that a certain external event is taking place where the external event may alter cloud resource usage. For example, a concert might taking place might suggest increased traffic on music-related social media platforms. Social media data can be indicators of events or can indicate increasing or decreasing interest in certain applications, products, news, travel opportunities, or the like. Data can be collected from outside data sources such as Web sites or social media platforms. Processing device 104 produces a projection or projections whenever the data in samples is relevant.

Still referring to FIG. 4, at block 410, processing device 104 executes a translate-to-action module in program code instructions 105 to interpret the projections and translate the projection or projections to an action or actions configured to adjust, for example, pod size, container size, CPU resource, memory, or replication factor assigned to a pod. The translate-to-action module can include, as an example, usage-action based mapping tables. A replication factor indicates how many replicas of the pod are maintained at any given time. Program code instructions 105 can include the translation-to-action module for interpreting the projections and identifying the specific resources and components that need to be dynamically changed. Once this determination is made, the resources for specific single or multiple component resources are dynamically adjusted at block 414 by processing device 104. The cluster resource allocation is adjusted in accordance with the determined, prospective cluster resource usage by adjusting allocated nodes, number of pods, or other resources. The projection portion of process 300 repeats continuously at block 416 unless training of the Artificial Intelligence (AI) model is initiated, in which case the process repeats from block 402.

FIG. 5 is a data flow diagram showing an example of using an Artificial Intelligence (AI) model for software cloud resource management according to some aspects of the disclosure. Assume for purposes of the example in data flow 500 that a company produces Product A. Data samples are gathered from external data source 502, Twitter®, in the form tweets that include the tag "#ProductA." This data is fed into the text analytics model 504. This Artificial Intelligence (AI) model is a machine-learning model trained to evaluate the sentiment of the user from the text that the user wrote about Product A. If the sentiment is positive and the model detects a sudden increase in interest or that the topic is suddenly trending, model 504 produces a projection indicating resource usage as a function of this trend, for example, as a function of the increasing number and frequency of positive tweets. This projection is passed to the translate-to-action module 516, which interprets this prediction for relevance to a specific application selling product A, in this case the node.js application running on a server in pod X in Kubernetes cluster 520. Module 516 also determines that pod X is running close to limits on memory and allocated CPU resources. Module 516 issues actions to dynamically increase pod X's CPU resources, memory and replication factor, shifting resources to pod X from the other pods in cluster 520 if necessary. Once the positive tweet frequency with respect to Product A decreases as indicated by the sentiment analysis, another prediction is produced, and an action is issued to take back or decrease CPU resources, memory, and replication factor of pod X.

In the example of FIG. 5, training data can be in a .csv file collected by a software component that scrapes tweets into the file based on a search criteria such as #ProductA. The data can be stored as rows of data in this csv file with columns indicating tweet date, tweeter name, tweet text, etc. This .csv file can be fed into the text Analysis machine learning model that indicates, for example, that 60% of the tweet texts are positive feedback for Product A. This data can also be fed into a model that can predict the trending or viral aspect of the tweets based on frequency of tweets by date. This model for example can predict 150% increase in tweets for the next week. This data of positive sentiment about to go viral can be translated to pod X that sells Product A should increase CPU 10%, memory 10%, and disk storage 10%.

FIG. 6 is a data flow diagram showing another example of using an Artificial Intelligence (AI) model for software cloud resource management according to some aspects of the disclosure. Assume for purposes of the example in data flow 600 that a company provides online space for users to upload media, such as pictures and video, and share the media with other users. Samples of social media event data 602 from various external sources such as Twitter, Facebook® and Meetup® are fed into a social media machine-learning model 604. This model 604 is trained to identify upcoming events that are gaining user interest where users will likely be interested in taking and sharing media such as pictures, audio, and video. The model 604 can then generate a projection based on the identified events. Once a projection is produced, the projection is passed to the translate-to-action module 616 that correlates this prediction to the specific application that hosts the media and controls the storage space where this media is saved. In one example, the model 604 may determine that event A is taking place on date Y in location Z, which will likely have a number of attendees that results in a 50% increase in media sharing. An action is issued to increase the disk storage space of pod X in Kubernetes cluster 620 where this application is containerized. Once the event is done, and user activity with regards to this event slows down on social media sites, then this extra disk storage space is decreased for pod X.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "above," "below," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
   a processing device; and
   a memory device including instructions that are executable by the processing device for causing the processing device to perform operations comprising:
   receiving a plurality of data samples including at least one of pictures, audio, or video from at least one source external to a cloud resource network running an application configured to host the at least one of pictures, audio, or video;
   producing a score from the plurality of data samples based on at least one of sentiment analysis or emotion analysis using an artificial intelligence (AI) model and trend predictions from a trending aspect model;
   generating at least one projection based on the score;
   correlating the at least one projection to cluster resources for the application;
   determining prospective cluster resource usage for the application based on the at least one projection;
   adjusting a cluster resource allocation for the application in accordance with the prospective cluster resource usage;
   receiving training data samples from the at least one source external to the cloud resource network; and
   training or retraining the AI model and the trending aspect model using the training data samples.

2. The system of claim 1, wherein the cluster resource allocation is configured to be adjusted by increasing, decreasing, or maintaining a number of nodes allocated to at least one network cluster.

3. The system of claim 1, wherein cluster resource allocation is configured to be adjusted by increasing, decreasing, or maintaining a number of pods assigned to the application, wherein each of the pods comprises at least one container.

4. The system of claim 1, wherein the operation of adjusting the cluster resource allocation further comprises interpreting the at least one projection by referring to a usage-action based mapping table to identify the cluster resources and components to be dynamically changed, wherein the cluster resource allocation is configured to be adjusted by increasing, decreasing, or maintaining at least one of central processing unit (CPU) resource, memory, disk storage, a number of nodes assigned to at least one network cluster, a number of pods assigned to the application, or a replication factor assigned to a pod.

5. The system of claim 1, wherein the instructions are executable for causing the processing device to perform an operation of identifying event user interest based on the at least one of pictures, audio, or video.

6. The system of claim 1, wherein the plurality of data samples further includes text.

7. A method comprising:
   receiving, by a processing device, a plurality of data samples including at least one of pictures, audio, or video from a plurality of sources external to a cloud resource network running an application configured to host the at least one of pictures, audio, or video;
   producing, by the processing device, a score from the plurality of data samples based on at least one of sentiment analysis or emotion analysis using an artificial intelligence (AI) model and trend predictions from a trending aspect model;
   generating, by the processing device, at least one projection based on the score;
   correlating, by the processing device, the at least one projection to cluster resources for the application;
   determining, by the processing device, prospective cluster resource usage for the application based on the at least one projection;
   adjusting, by the processing device, a cluster resource allocation for the application in accordance with the prospective cluster resource usage;
   receiving training data samples from the plurality of sources external to the cloud resource network; and
   training or retraining the AI model and the trending aspect model using the training data samples.

8. The method of claim 7, wherein the cluster resource allocation is adjusted by increasing, decreasing, or maintaining a number of nodes allocated to at least one network cluster.

9. The method of claim 7, wherein the cluster resource allocation is adjusted by increasing, decreasing, or maintaining a number of pods assigned to the application, wherein each of the pods comprises at least one container.

10. The method of claim 7, wherein adjusting the cluster resource allocation further comprises interpreting the at least one projection by referring to a usage-action based mapping table to identify the cluster resources and components to be dynamically changed, wherein the cluster resource allocation is configured to be adjusted by increasing, decreasing, or maintaining at least one of central processing unit (CPU) resource, memory, disk storage, a number of nodes assigned to at least one network cluster, a number of pods assigned to the application, or a replication factor assigned to a pod.

11. The method of claim 7, further comprising identifying event user interest based on the at least one of pictures, audio, or video.

12. The method of claim 7, wherein the plurality of data samples further includes text.

13. A non-transitory computer-readable medium comprising program code that is executable by a processing device for causing the processing device to:
- receive a plurality of data samples including at least one of pictures, audio, or video from a plurality of sources external to a cloud resource network running an application configured to host the at least one of pictures, audio, or video;
- produce a score from the plurality of data samples based on at least one of sentiment analysis or emotion analysis using an artificial intelligence (AI) model and trend predictions from a trending aspect model;
- generate at least one projection based on the score;
- correlate the at least one projection to cluster resources for the application;
- determine prospective cluster resource usage for the application based on the at least one projection;
- adjust a cluster resource allocation for the application in accordance with the prospective cluster resource usage;
- receive training data samples from the plurality of sources external to the cloud resource network; and
- train or retrain the AI model and the trending aspect model using the training data samples.

14. The non-transitory computer-readable medium of claim 2, wherein the cluster resource allocation is configured to be adjusted by increasing, decreasing, or maintaining a number of nodes allocated to at least one network cluster.

15. The non-transitory computer-readable medium of claim 13, wherein the cluster resource allocation is configured to be adjusted by increasing, decreasing, or maintaining a number of pods assigned to the application, wherein each of the pods comprises at least one container.

16. The non-transitory computer-readable medium of claim 13, further comprising program code that is executable for causing the processing device to interpret the at least one projection by referring to a usage-action based mapping table to identify the cluster resources and components to be dynamically changed, wherein the cluster resource allocation is configured to be adjusted by increasing, decreasing, or maintaining at least one of central processing unit (CPU) resource, memory, disk storage, a number of nodes assigned to at least one network cluster, a number of pods assigned to the application, or a replication factor assigned to a pod.

17. The non-transitory computer-readable medium of claim 13, wherein the plurality of data samples further includes text.

* * * * *